US012597054B2

(12) United States Patent
Massicotte

(10) Patent No.: US 12,597,054 B2
(45) Date of Patent: Apr. 7, 2026

(54) METHOD AND SYSTEM OF FORWARDING CONTACT DATA

(71) Applicant: Louis Massicotte, Quebec (CA)

(72) Inventor: Louis Massicotte, Quebec (CA)

(73) Assignee: FIDUCIE DES BRAVES 2021, Quebec (CA)

( * ) Notice: Subject to any disclaimer, the term of this patent is extended or adjusted under 35 U.S.C. 154(b) by 0 days.

(21) Appl. No.: 18/166,674

(22) Filed: Feb. 9, 2023

(65) Prior Publication Data

US 2023/0186357 A1     Jun. 15, 2023

Related U.S. Application Data

(63) Continuation of application No. 16/870,011, filed on May 8, 2020, now Pat. No. 11,610,244, which is a
(Continued)

(30) Foreign Application Priority Data

Jul. 17, 2015     (CA) ................................. CA 2897771

(51) Int. Cl.
G06Q 30/0601         (2023.01)
G06F 16/955         (2019.01)
(Continued)

(52) U.S. Cl.
CPC ..... G06Q 30/0605 (2013.01); G06F 16/9558 (2019.01); G06Q 10/107 (2013.01);
(Continued)

(58) Field of Classification Search
CPC .......................... G06F 16/9558; G06Q 10/107; G06Q 30/605; G06Q 30/0611; H04L 65/4015; H04L 65/611; H04L 65/612
See application file for complete search history.

(56) References Cited

U.S. PATENT DOCUMENTS 6,282,517 B1     8/2001   Wolfe et al.
6,647,373 B1    11/2003   Carlton-Foss
(Continued)

FOREIGN PATENT DOCUMENTS

WO        2011044621 A1     4/2011

OTHER PUBLICATIONS

"Edmunds Price Promise: Your Path to Savings", Edmunds.com, Website, [Retrieved from the Internet on May 1, 2015], United States.
(Continued)

*Primary Examiner* — Thomas J Dailey
(74) *Attorney, Agent, or Firm* — Reno Lessard; Norton rose fulbright Canada LLP

(57)                ABSTRACT

There is described a computer-implemented method of forwarding contact data associated with a potential customer. The method comprising has: receiving customer purchase data from the potential customer, the customer purchase data comprising the contact data and mortgage preference data; publishing a purchase interest notification on an Internet-based live data stream accessible by a plurality of lenders via Internet, the purchase interest notification including the mortgage preference data of the customer purchase data; receiving a plurality of interest notices associated with the purchase interest notification from interested ones of the plurality of lenders; and forwarding the contact data of the potential customer to at least one privileged lender based on said reception.

18 Claims, 9 Drawing Sheets

200

Related U.S. Application Data continuation-in-part of application No. 15/205,157, filed on Jul. 8, 2016, now Pat. No. 10,664,884.

(51) Int. Cl.

| | |
|---|---|
| *G06Q 10/107* | (2023.01) |
| *H04L 65/401* | (2022.01) |
| *H04L 65/611* | (2022.01) |
| *H04L 65/612* | (2022.01) |

(52) U.S. Cl.

CPC ...... *G06Q 30/0611* (2013.01); *H04L 65/4015* (2013.01); *H04L 65/611* (2022.05); *H04L 65/612* (2022.05)

(56) References Cited

U.S. PATENT DOCUMENTS

| | | | |
|---|---|---|---|
| 7,130,815 | B1 | 10/2006 | Gupta |
| 7,778,885 | B1 | 8/2010 | Semprevivo et al. |
| 8,204,788 | B1 | 6/2012 | Ivankovich |
| 8,515,821 | B2 | 8/2013 | Center et al. |
| 8,660,943 | B1 * | 2/2014 | Chirehdast ............. G06Q 40/03 |
| | | | 705/38 |
| 8,744,925 | B2 | 6/2014 | Seergy |
| 8,756,112 | B1 | 6/2014 | Edelman |
| 8,868,480 | B2 | 10/2014 | McBride et al. |
| 2005/0010507 | A1 * | 1/2005 | Straub ................... G06Q 40/02 |
| | | | 705/35 |
| 2005/0065853 | A1 | 3/2005 | Ferreira |
| 2007/0244797 | A1 | 10/2007 | Hinson et al. |
| 2010/0088158 | A1 | 4/2010 | Pollack |
| 2012/0130859 | A1 | 5/2012 | Wolfe et al. |
| 2012/0265634 | A1 | 10/2012 | Kinney |
| 2013/0006913 | A1 | 1/2013 | Stafford et al. |
| 2013/0006916 | A1 | 1/2013 | McBride et al. |
| 2015/0317728 | A1 * | 11/2015 | Nguyen ................. G06Q 40/02 |
| | | | 705/38 |
| 2016/0071177 | A1 | 3/2016 | Launay |

OTHER PUBLICATIONS

"TrueCar FAQ (Frequently Asked Questions)", TrueCar.com, Website, [Retrieved from the Internet on May 1, 2015], United States.
"How It Works", CarClearanceDeals.com, Website, [Retrieved from the Internet on May 1, 2015], United States.

* cited by examiner

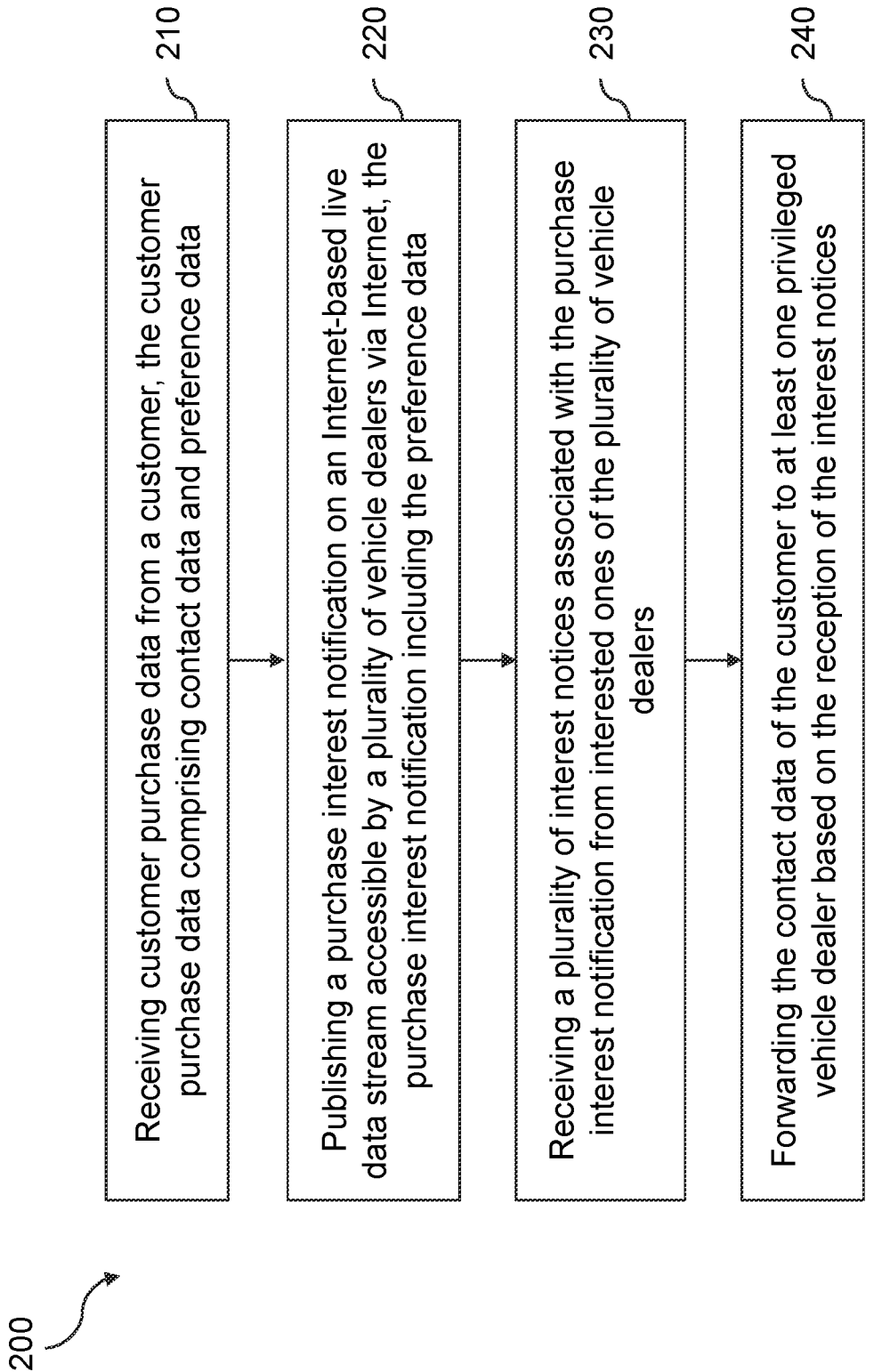

Receiving customer purchase data from a customer, the customer purchase data comprising contact data and preference data — 210

Publishing a purchase interest notification on an Internet-based live data stream accessible by a plurality of vehicle dealers via Internet, the purchase interest notification including the preference data — 220

Receiving a plurality of interest notices associated with the purchase interest notification from interested ones of the plurality of vehicle dealers — 230

Forwarding the contact data of the customer to at least one privileged vehicle dealer based on the reception of the interest notices — 240

METHOD AND SYSTEM OF FORWARDING CONTACT DATA

BACKGROUND

In the vehicle market, potential customers typically shop amongst a plurality of vehicle dealers to gather sufficient data concerning a new vehicle to be potentially bought (e.g. price data, technical data, intangible appreciation data) in order to select the new vehicle to be bought to a given degree of satisfaction.

While the technical data can be simply gathered from pamphlets, vehicle review books and/or Internet websites, some other data, such as the price data, are subject to variation from a vehicle dealer to another. Therefore, in order to gather satisfactorily accurate price data, the potential customers can visit one or more of the vehicle dealers. In some circumstances, such visits can be time-consuming for both the potential customers and the vehicle dealers. Although such time-consuming may be useful in some circumstances, there remains room for improvement in terms of alleviating at least some aspects of the shopping experience for the potential customers and/or for the vehicle dealers.

SUMMARY

One specific need occurs when a potential customer desires to be contacted by one or more vehicle dealers based on a desired price (e.g. monthly payment) and/or on a desired vehicle make and/or model while avoiding to be contacted by too many vehicle dealers, which can be inconvenient. One other specific need occurs when a vehicle dealer wishes to contact, in a privileged manner, potential customers having shown at least an interest in the purchase of a new vehicle. While being contacted by too many vehicle dealers can be bothersome for a potential customer, contacting a potential customer which has already been contacted by too many other vehicle dealers can also be inconvenient.

In accordance with an aspect, there is provided computer-implemented systems and methods which allow one or more privileged vehicle dealer to contact a given potential customer concerning the purchase of his/her new vehicle. The computer-implemented systems and methods involve the use of an Internet-based live data stream which publishes purchase interest notifications associated with a plurality of potential customers and which is accessible by a plurality of vehicle dealers. Once published, the computer-implemented systems and methods can receive interest notices from the vehicle dealers, transmitted via the Internet-based live data stream, indicating that some of the vehicle dealers are interested in contacting a given potential customer associated with a given purchase interest notification. Based on the interest notices, the computer-implemented methods and systems forward contact data associated with the given potential customer to at least one privileged dealer based on the received interest notices.

In accordance with another aspect, said forwarding the contact data to at least one privileged vehicle dealer can be based on the first ones of the vehicle dealers who showed interest to respond to the purchase interest notification.

In accordance with another aspect, there is provided a computer-implemented method of forwarding contact data associated with a potential customer, the method comprising the steps of: receiving customer purchase data from the potential customer, the customer purchase data comprising the contact data and preference data; publishing a purchase interest notification on an Internet-based live data stream accessible by a plurality of vehicle dealers via Internet, the purchase interest notification including the preference data of the customer purchase data; receiving a plurality of interest notices associated with the purchase interest notification from interested ones of the plurality of vehicle dealers; and forwarding the contact data of the potential customer to at least one privileged vehicle dealer based on said reception.

In accordance with another aspect, there is provided a system for forwarding contact data associated with a potential customer, the system comprising: a processor coupled with a computer-readable memory, the computer-readable memory being configured for storing computer executable instructions that, when executed by the processor, perform the steps of: receiving customer purchase data from the potential customer, the customer purchase data comprising the contact data and preference data; publishing a purchase interest notification on an Internet-based live data stream accessible by a plurality of vehicle dealers via Internet, the purchase interest notification including the preference data; receiving a plurality of interest notices associated with the purchase interest notification from interested ones of the plurality of vehicle dealers; and forwarding the contact data of the potential customer to at least one privileged vehicle dealer thereby allowing the at least one privileged vehicle dealer to contact the potential customer in response to the customer purchase data.

In accordance with another aspect, there is provided a computer program product for forwarding contact data associated with a potential customer, the computer software product comprising: a computer-readable memory configured for storing computer executable instructions that when executed by a processor perform the steps of: receiving customer purchase data from the potential customer, the customer purchase data comprising preference data and the contact data; publishing a purchase interest notification on an Internet-based live data stream accessible by a plurality of vehicle dealers via Internet, the purchase interest notification including the preference data of the customer purchase data; receiving a plurality of interest notices associated with the purchase interest notification from interested ones of the plurality of vehicle dealers; and forwarding the contact data associated with the potential customer to at least one privileged vehicle dealer based on said reception of the plurality of interest notices.

One other specific need occurs when a vehicle dealer associated with a make different from the make indicated in a purchase interest notification associated with a given customer wishes to contact the given customer in order to discuss a vehicle of a different make. There is thus provided computer-implemented methods and systems which include forwarding the contact data associated with the potential customer to at least one vehicle dealer which is associated with a make different from the make indicated in the purchase interest notification.

In accordance with another aspect, there is provided a computer-implemented method of forwarding contact data associated with a potential customer, the method comprising the steps of: receiving customer purchase data from the potential customer, the customer purchase data comprising the contact data and mortgage preference data; publishing a purchase interest notification on an Internet-based live data stream accessible by a plurality of lenders via Internet, the purchase interest notification including the mortgage preference data of the customer purchase data; receiving a plurality of interest notices associated with the purchase interest notification from interested ones of the plurality of lenders; and forwarding the contact data of the potential customer to at least one privileged lender based on said reception.

In accordance with another aspect, there is provided a system for forwarding contact data associated with a potential customer, the system comprising: a processor coupled with a computer-readable memory, the computer-readable memory being configured for storing computer executable instructions that, when executed by the processor, perform the steps of: receiving customer purchase data from the potential customer, the customer purchase data comprising the contact data and mortgage preference data; publishing a purchase interest notification on an Internet-based live data stream accessible by a plurality of lenders via Internet, the purchase interest notification including the mortgage preference data; receiving a plurality of interest notices associated with the purchase interest notification from interested ones of the plurality of lenders; and forwarding the contact data of the potential customer to at least one privileged lender thereby allowing the at least one privileged lender to contact the potential customer in response to the customer purchase data.

In accordance with another aspect, there is provided a computer program product for forwarding contact data associated with a potential customer, the computer software product comprising: a computer-readable memory configured for storing computer executable instructions that when executed by a processor perform the steps of: receiving customer purchase data from the potential customer, the customer purchase data comprising mortgage preference data and the contact data; publishing a purchase interest notification on an Internet-based live data stream accessible by a plurality of lenders via Internet, the purchase interest notification including the mortgage preference data of the customer purchase data; receiving a plurality of interest notices associated with the purchase interest notification from interested ones of the plurality of lenders; and forwarding the contact data associated with the potential customer to at least one privileged lender based on said reception of the plurality of interest notices.

Many further features and combinations thereof concerning the present improvements will appear to those skilled in the art following a reading of the instant disclosure.

DESCRIPTION OF THE FIGURES

In the figures,

FIG. 2 is a flowchart showing an example of a method of forwarding contact data associated with a potential customer to at least one privileged vehicle dealer, in accordance with an embodiment;

These figures depict example embodiments for illustrative purposes, and variations, alternative configurations, alternative components and modifications may be made to these example embodiments.

DETAILED DESCRIPTION

Figure 1:
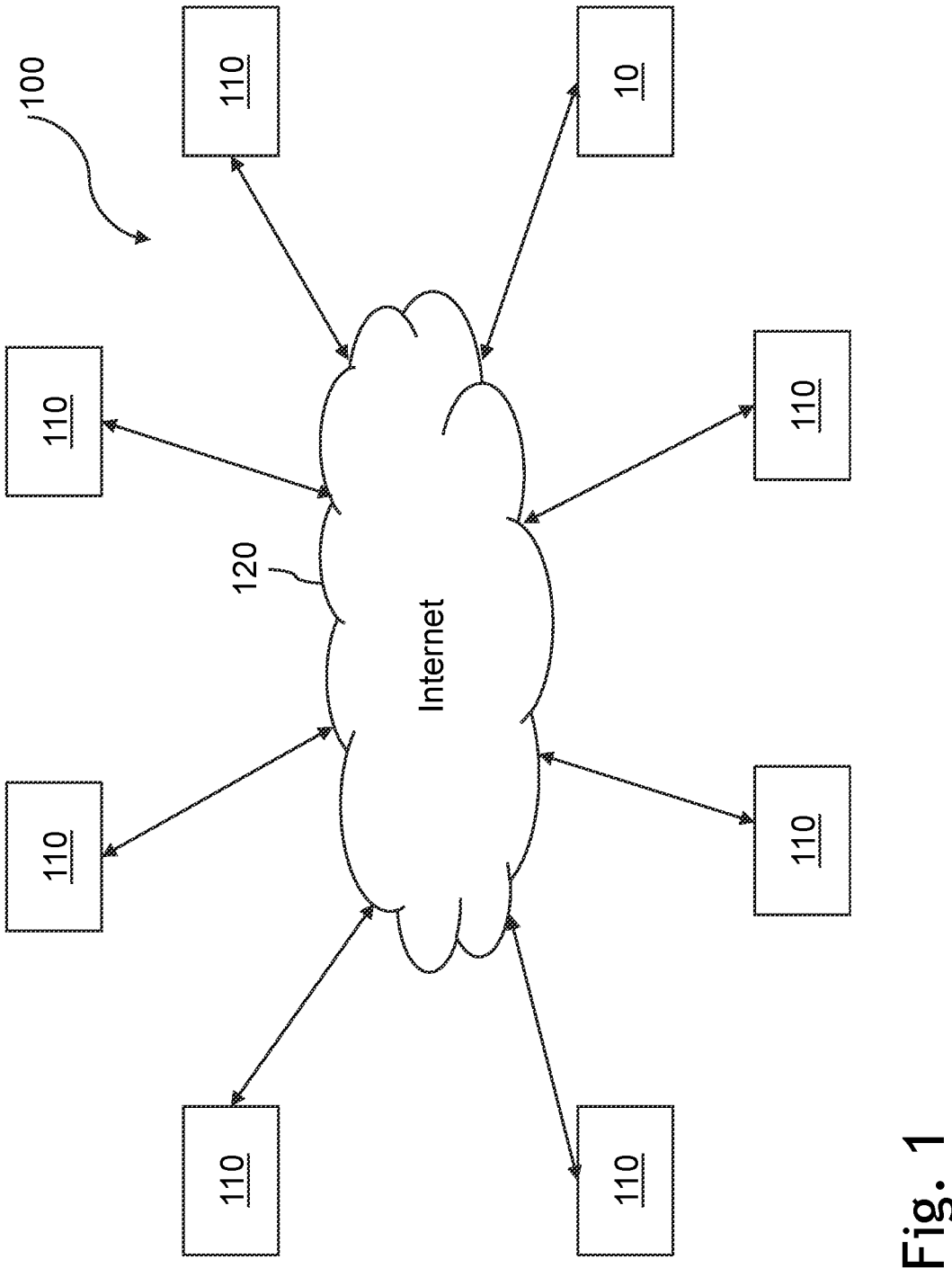
FIG. 1 is a schematic view of an example of an Internet-based network.

FIG. 1 illustrates an example of an Internet-based network 100 that is used in the methods and systems described in this disclosure. The Internet-based network includes a plurality of computers 110 which are interconnected with one another via the Internet 120. Each computer 110 of the network 100 can transmit data towards another computer 110 of the network 100 via the Internet 120 and/or receive data from another computer 110 via the Internet 120. Each computer 110 can be a desktop computer, a laptop computer, and/or any mobile devices such as a smart phone or an electronic tablet, for instance.

FIG. 2 shows a flowchart of an example of a computer-implemented method 200 for forwarding contact data associated with a potential customer to at least one privileged vehicle dealer. As will be understood, each step of the computer-implemented method 200 can be performed either by a single computer 110 or by a plurality of computers 110, which can be collectively referred to herein as "the system". In an embodiment, the system, generally shown at 10 in FIG. 1, is embodied in the form of a single computer 110, for instance. In another embodiment, the system 10 is provided in the form of a server.

The computer-implemented method 200 has a step 210 of receiving, by the system 10, customer purchase data from a potential customer via the Internet 120. The customer purchase data comprise contact data and preference data. The contact data are meant to encompass any data which can be used to contact the potential customer. For instance, the contact data can be one or more telephone number and/or one or more email address associated with the potential customer. The preference data can be data which indicate the preferences associated with a new vehicle that the potential customer would be interested to purchase. It will be understood that the vehicle can be anything used for transporting people or goods, especially on land, such as a car, truck, cart and the like. In an embodiment, the preference data can include desired price data indicating, for instance, a desired monthly term that the potential customer can afford. In another embodiment, the preference data can include vehicle make data such as a vehicle make (e.g. Honda™, Volvo™, Porsche™ and the like). In still another, the preference data can include both the desired price data and the vehicle make data. In alternate embodiments, the preference data can include geographical data (e.g. a zip code associated with the potential customer), estimated purchase date data, vehicle status data (e.g. new, used, in good condition) and/or vehicle model data and vehicle year data.

In an embodiment, the potential customer browses on a website (e.g. the website Automatix.ca) where he/she can fill an electronic form having fields associated with the contact data, the vehicle make data and the preference data. Once the electronic form is filled and submitted, it can be received, via the Internet 120, by the system 10 for use with other steps (e.g. 220, 230 and 240) of the computer-implemented method 200. In a specific example, the potential customer uses his/her smart phone to fill the electronic form accessible on the website so that the customer purchase data can be received by the system 10 thereafter.

Still referring to FIG. 2, the computer-implemented method 200 has a step 220 of publishing, by the system 10, a purchase interest notification on an Internet-based live data stream accessible by a plurality of vehicle dealers. The purchase interest notification includes only a portion of the customer purchase data, i.e. the preference data. By doing so, the vehicle dealers do not have direct access to the contact data so that the vehicle dealers cannot contact the potential customer directly solely based on the published purchase interest notification. In an embodiment, the system 10, upon reception of the customer purchase data, is configured to, in real-time or in near real-time, publish the purchase interest notification on the Internet-based live data stream to be seen by the vehicle dealers. In an embodiment, the vehicle dealers can be associated with a given make, or associated with different makes. In another embodiment, the vehicle dealer is a new and/or a used vehicle dealer. In still another embodiment, the vehicle dealer is a wholesaler. The Internet-based live data stream can be any type of platform accessible via Internet and which allows instant publication of the data to the vehicle dealers. In an embodiment, the Internet-based live data stream can notify the vehicle dealers that a new purchase interest notification has been published. In another embodiment, the Internet-based live data stream is embodied in the form of a Facebook™ live feed, a Facebook™ group or a Facebook™ private group. It will thus be understood that any other suitable Internet-based live data stream 22 can be used. In this specific embodiment, the system 10 is configured to allow access to the Facebook™ group to member vehicle dealers only.

Figure 3A:
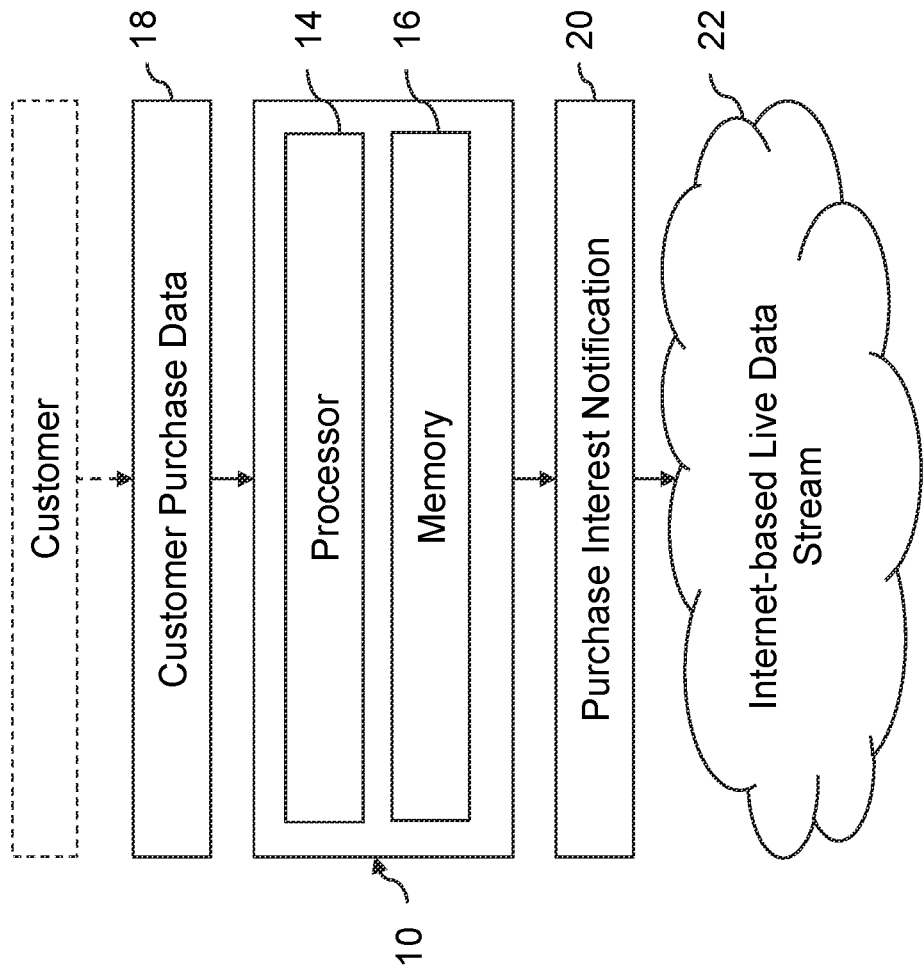
FIGS. 3A-D are schematic views of the steps of the method shown in FIG. 2, in accordance with an embodiment.
Figure 3B:
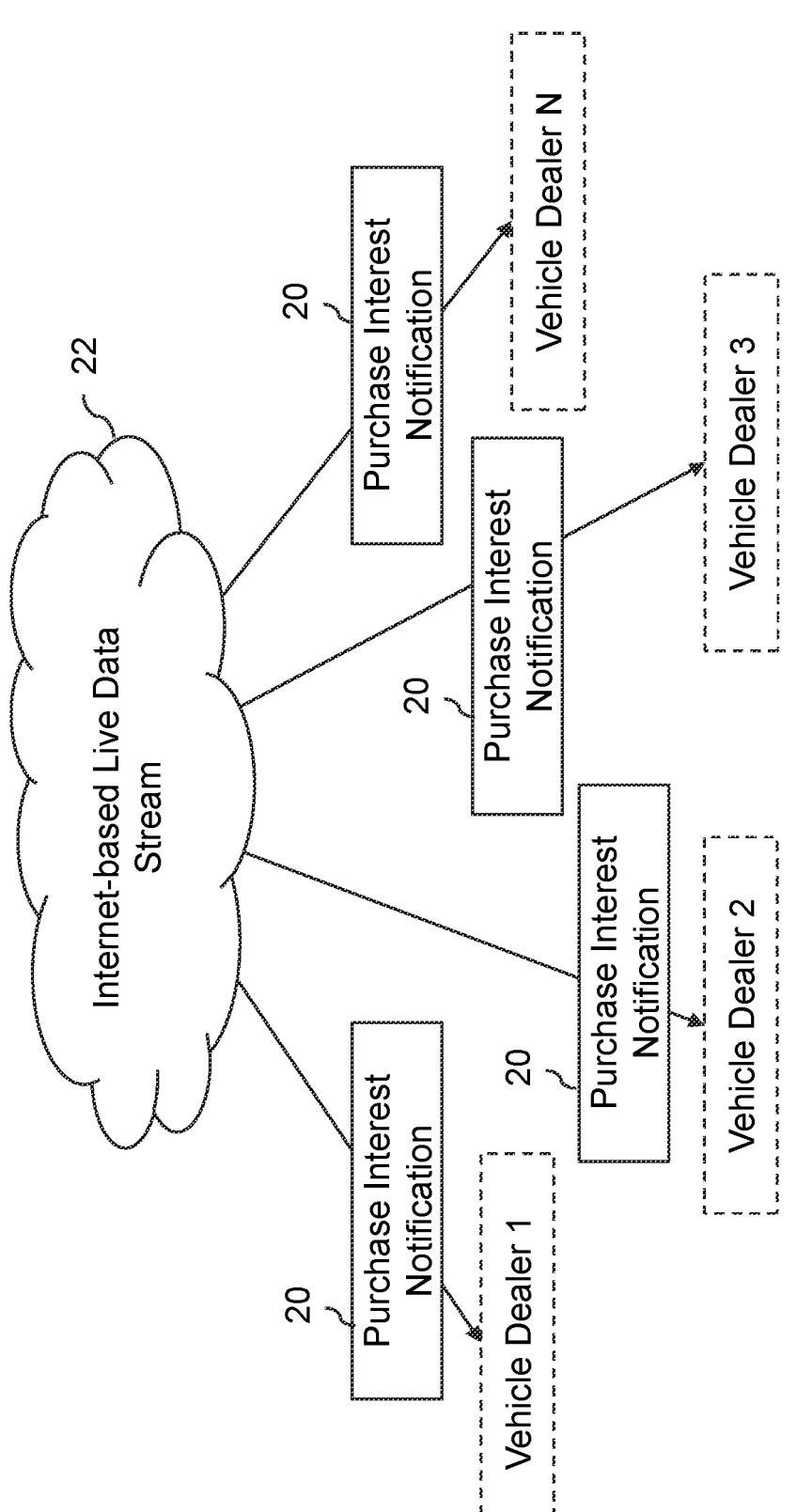

Referring now to FIG. 3A, the system 10 for forwarding contact data associated with a potential customer is generally shown at 10. The system 10 typically has a processor 14 in communication with a computer-readable memory 16 and can access to the Internet 120. The processor 14 can be in wired or in wireless communication with the computer-readable memory 16. Alternately, the system 10 can be in wired or in wireless communication with the Internet 120. As depicted in FIG. 3A, the system 10 receives the customer purchase data 18 which has been provided by the potential customer via a website, for instance. Once the customer purchase data 18 are received by the system 10, the system 10 is configured to publish the purchase interest notification 20 on the Internet-based live data stream 22 to be seen by the vehicle dealer 1, the vehicle dealer 2, the vehicle dealer 3 and the vehicle dealer N, as shown in FIG. 3B. Only a few vehicle dealers are shown in FIG. 3B. It is understood that the number N of vehicle dealers is not limited to a precise number. For instance, the number N of vehicle dealers can be as few as two, three, four and as high as a hundred or a thousand, depending on the circumstances. It is understood that use of the term "vehicle dealer" is meant to encompass any employee and/or sales representative of the vehicle dealer.

Referring back to FIG. 2, the method has a step 230 of receiving, by the system 10, one or a plurality of interest notices 24 associated with one of the purchase interest notifications 20 published on the Internet-based live data stream 22. The interest notices 24 are received by the system 10 once the interest notices 24 are sent from interested ones of the vehicle dealers (referred to as "the interested vehicle dealers") having access to the Internet-based live data stream 22. In an embodiment, the Internet-based live data stream 22 allows the vehicle dealers to show their interest by clicking on a button associated with the purchase interest notification 20 which is published in the Internet-based live data stream 22. In an embodiment, the interest notices 24 are transmitted, by the interested vehicle dealers, directly to the system 10 via the Internet 120. In another embodiment, the interest notices 24 are published on the Internet-based live data stream 22 (e.g. in association with the published purchase interest notification 20) and the system 10 is configured to fetch the interest notices 24 from the Internet-based live data stream 22 such that the interest notices 24 are received by the system 10 in an indirect manner. In the specific embodiment where the Internet-based live data stream 22 is a Facebook™ private group, the interest notices 24 can be transmitted by clicking on a "Like Button" or by commenting under the purchase interest notification 20, for instance. In an embodiment, the interest notices 24 are received in chronological order depending on which of the interested vehicle dealers respond first. In this specific embodiment, the system 10 can associate a time value (e.g. the time at which interest notice 24 is received) associated with each of the interest notices 24 received by the system 10 and store the time values on the memory 16 of the system 10.

Figure 3C:
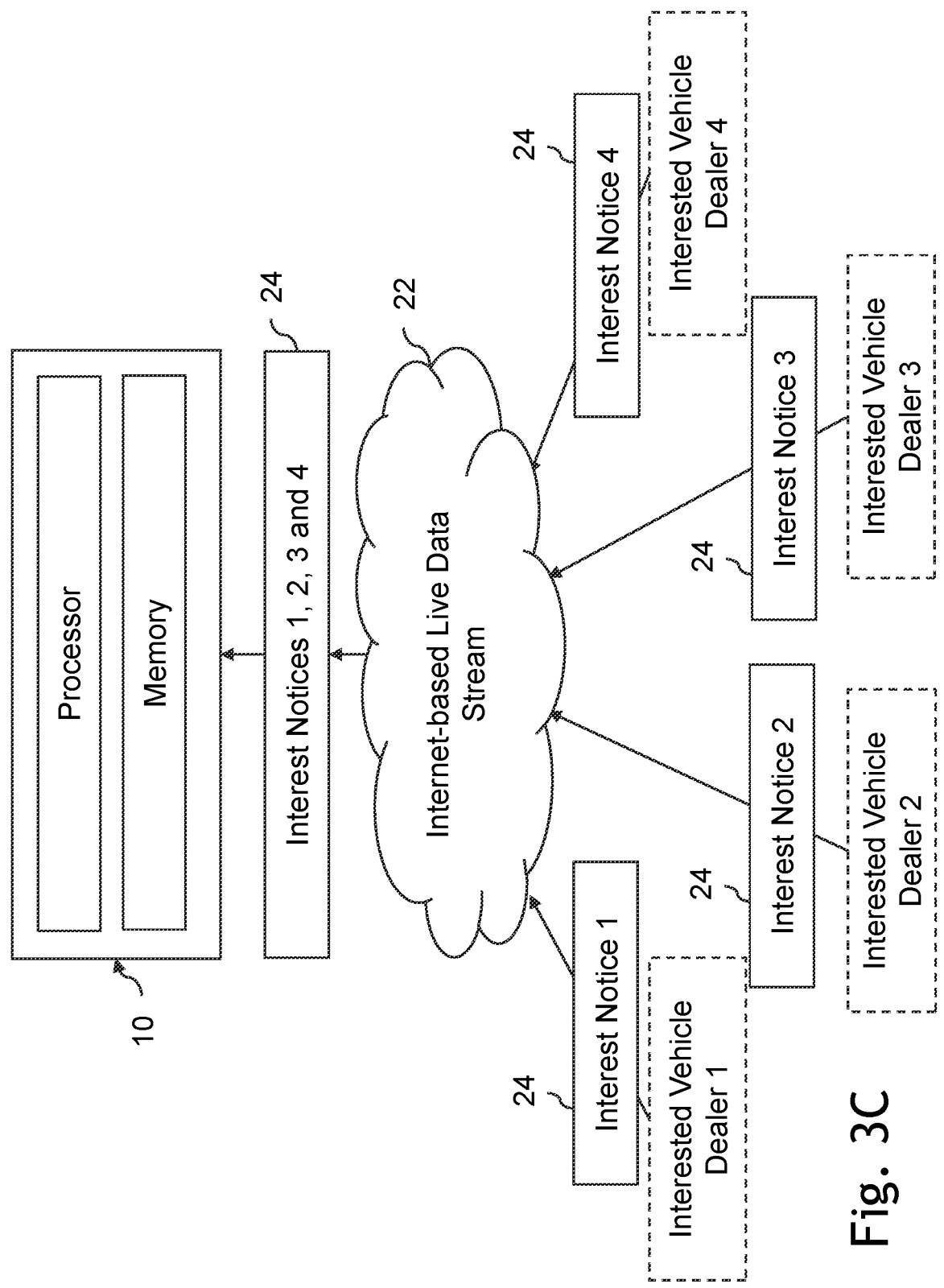

Regarding the step 230 of receiving the interest notices 24, reference is now made to FIG. 3C. As shown, FIG. 3C is a schematic view that shows the indirect communication of the interest notices 1, 2, 3 and 4 to the system 10 by the interested vehicle dealers via the Internet-based live data stream 22.

Figure 3D:
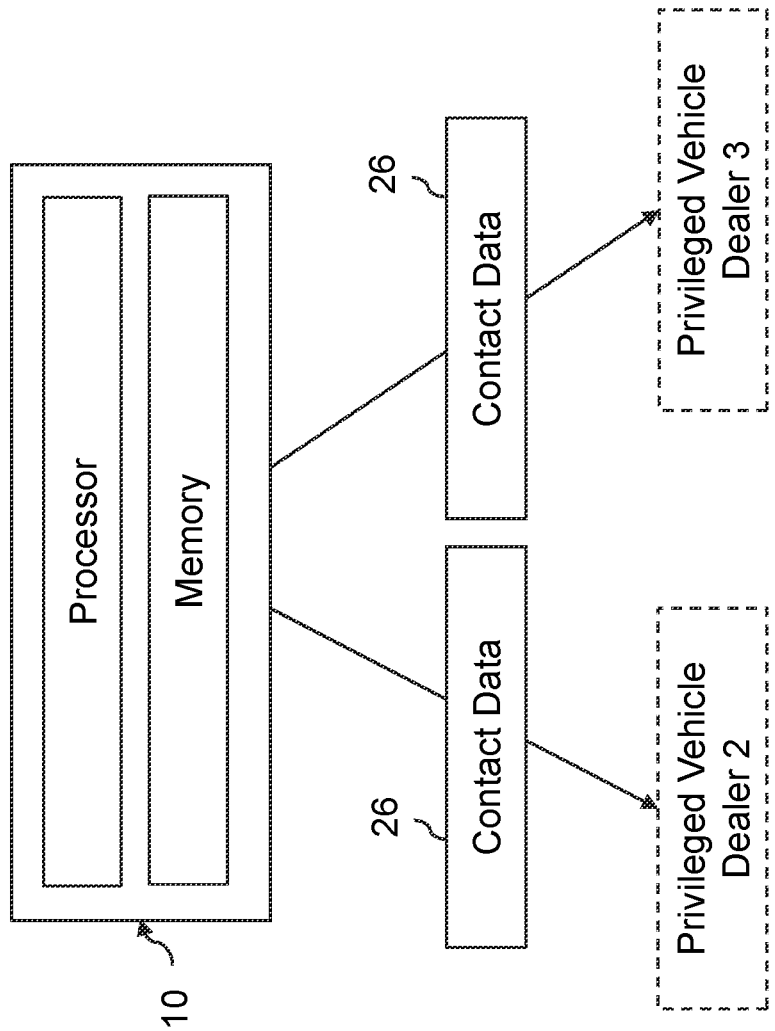

Referring back to FIG. 2, the method has a step 240 of forwarding the contact data of the potential customer to at least one privileged vehicle dealer based on the reception of the interest notices 24. Indeed, once the interest notices 24 are received by the system 10, the latter is configured to forward the contact data 26 associated with the purchase interest notification 20 which is, in turn, associated to a given potential customer, to the privileged vehicle dealers 2 and 3, for instance, as shown in FIG. 3D. Once the contact data 26 are forwarded to the privileged vehicle dealers, it is understood that the privileged vehicle dealers can contact the given potential customer in order to respond to his/her published purchase interest notification 20. For instance, in the case where a given purchase interest notification 20 indicates that a given customer is interested in buying a new Honda™, one privileged vehicle dealer can be a Honda™ vehicle dealer and one other privileged vehicle dealer can be a used vehicle dealer having at least one vehicle of make Honda™ which can correspond to the interest of the given customer. In this specific example, the given customer can be contacted by the Honda™ vehicle dealer and by the used vehicle dealer. The methods and systems described herein can thus allow the given customer to be contacted by a limited, and controlled, number of privileged vehicle dealers while the privileged vehicle dealers can contact the potential customer without having to compete with too many other privileged vehicle dealers. The number of privileged vehicle dealers is determined by the system 10 and depends on the embodiments. For instance, in an embodiment, the number of privileged vehicle dealers is limited to four. In another embodiment where the customer purchase data 18 have geographical data associated with a potential customer, the system 10 can be configured to forward the contact data 26 to privileged vehicle dealers that have a geographical position substantially near the location of the potential customer based on the geographical data. In an alternate embodiment, the system 10 can be configured to forward the contact data 26 to privileged vehicle dealers that are not located near the location of the potential customer, which can provide interesting opportunities for vehicle dealers to access new markets. In alternate embodiments, forwarding the contact data 26 to the privileged vehicle dealers includes associating a time value to each one of the received interest notices 24. In this specific example, the interested vehicle dealers who showed their interest to respond to the purchase interest notification 20 are selected to be privileged vehicle dealers. There is thus an incentive for encouraging the vehicle dealers to monitor the Internet-based live data stream 22 in real-time and to promptly react in accordance with the published purchase interest notifications 20. Accordingly, in this example, transmitting interest notices 24 promptly can increase the chances of being forwarded by the contact data 26. In the case where the number of received interest notices 24 is lower than the predetermined number of privileged vehicle dealers, every interested vehicle dealers can become privileged vehicle dealers and receive the contact data 26 associated with a given potential customer.

Figure 4A:
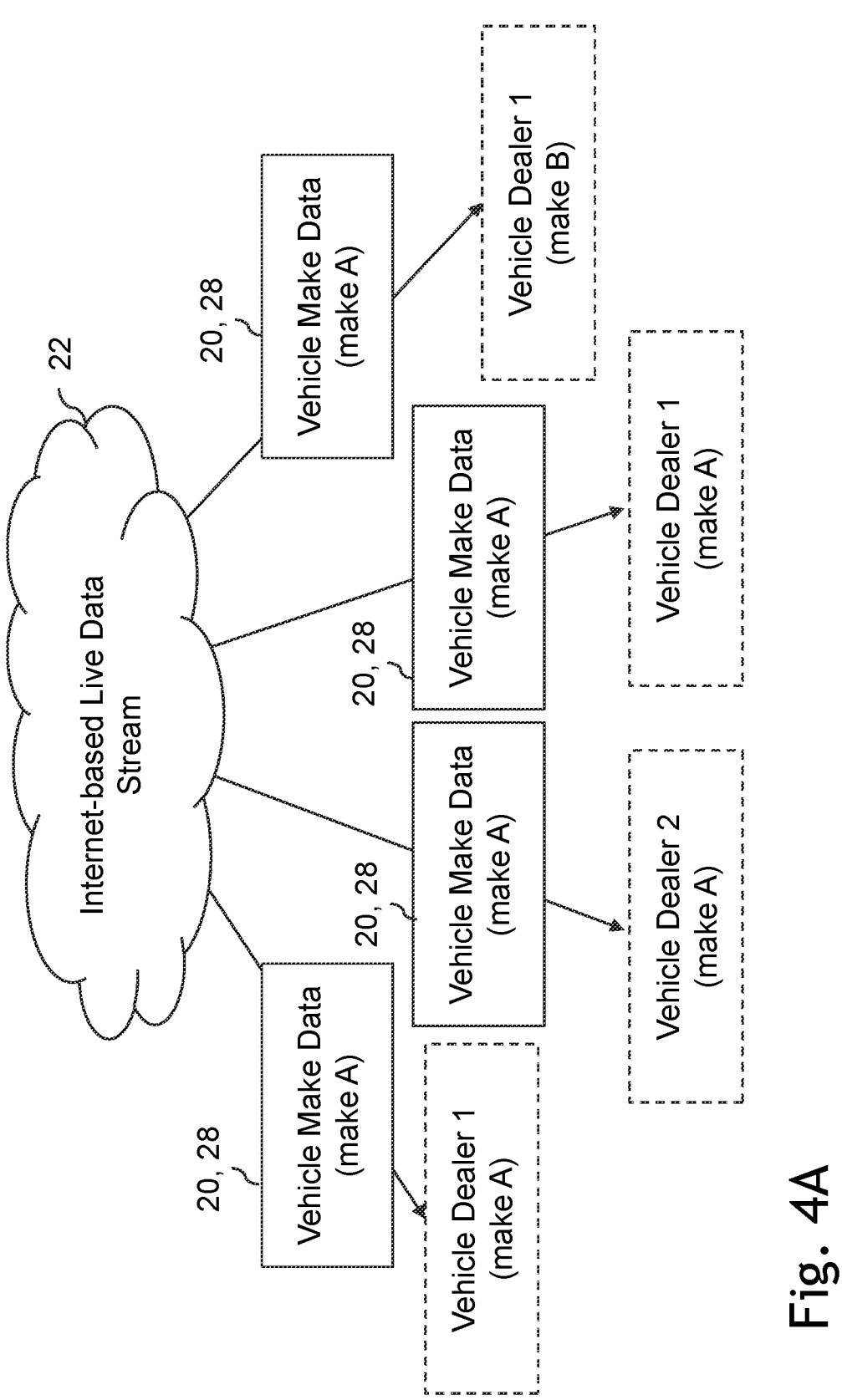
FIGS. 4A-C are schematic views of steps of another example of a method of forwarding contact data to at least one privileged vehicle dealer, in accordance with an embodiment.
Figure 4B:
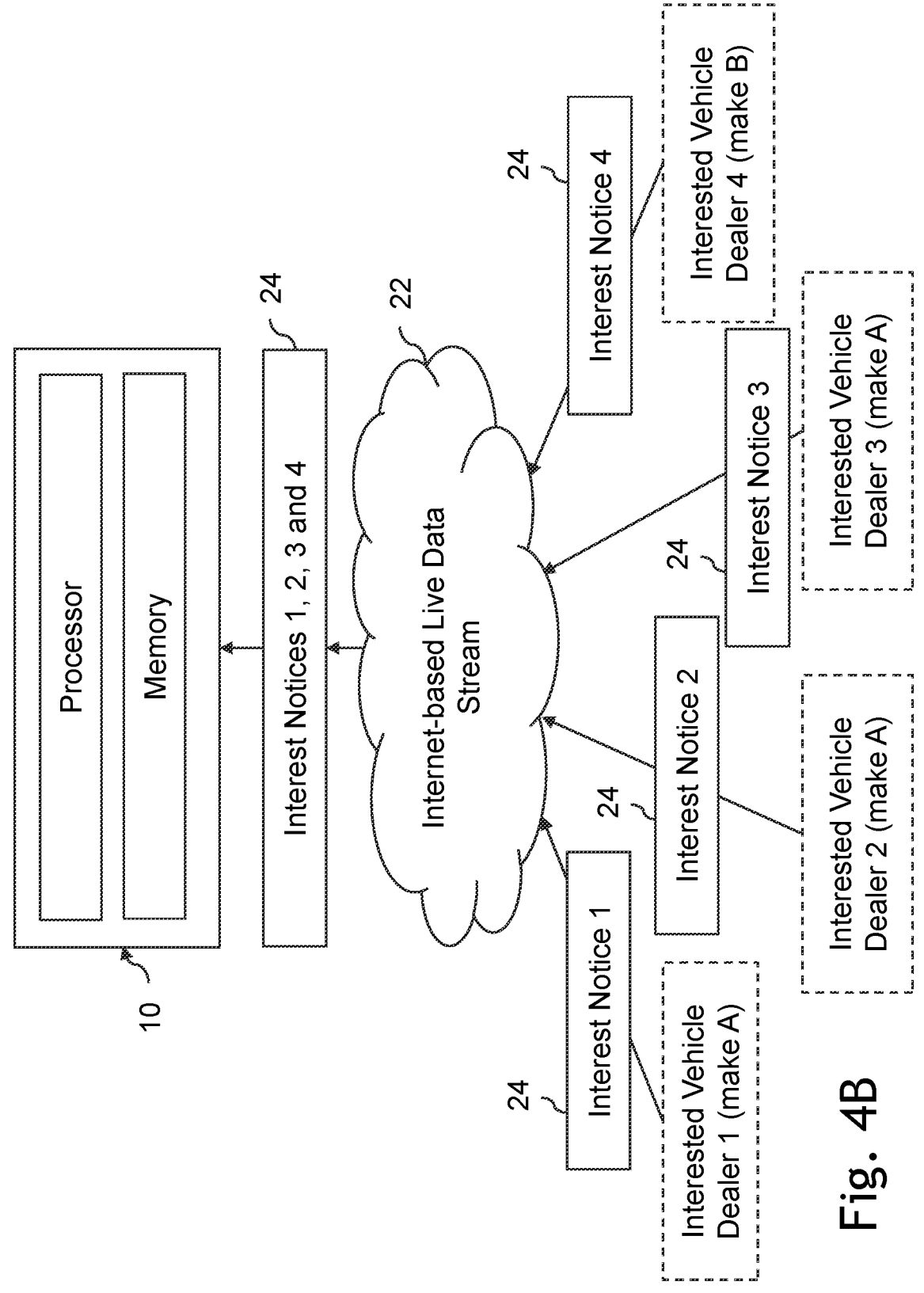
Figure 4C:
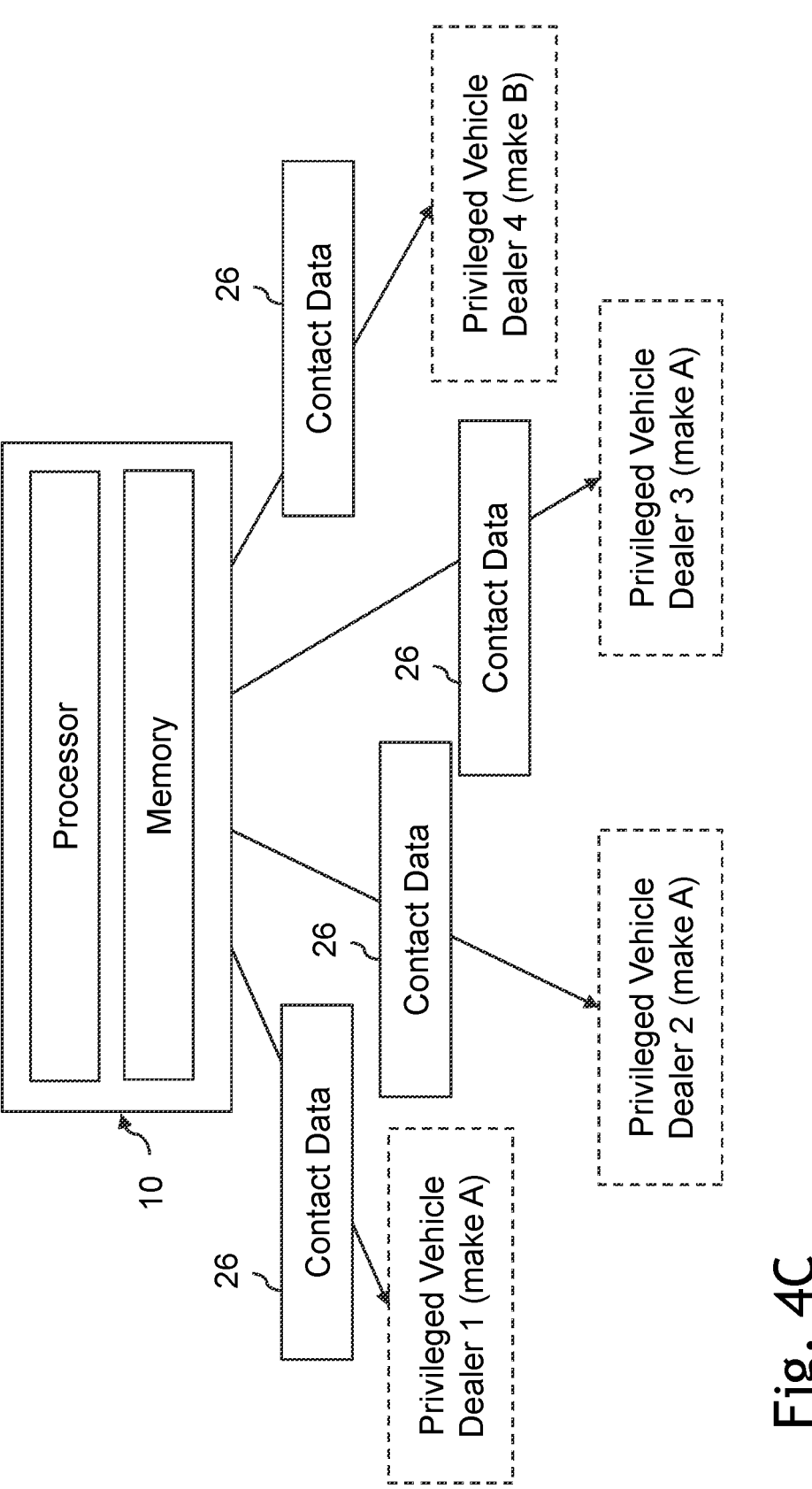

In another embodiment of the method 200, the preference data comprise the vehicle make data which indicate that a given potential customer wishes to buy a new vehicle of make A (e.g. a new vehicle of make Honda™). In this embodiment, the method 200 can have an optional step of forwarding the contact data 26 to at least one privileged vehicle dealer associated with a make B which is different from the make A associated with the vehicle make data of the customer purchase data 18. More specifically, FIGS. 4A-C show schematic views illustrating this embodiment. It will be understood that after the step 210 of receiving the customer purchase data 18 and after the step 230 of publishing the purchase interest notification 20 (comprising the vehicle make data 28 as shown in FIG. 4A) on the Internet-based live data stream 22, the purchase interest notification 20 can be accessible by vehicle dealers of different makes. Indeed, in the illustrated example, the vehicle dealers 1, 2 and 3 are associated with the make A (e.g. Honda™ vehicle dealers), which is similar to the make desired by the potential customer. However, in this embodiment, the purchase interest notification 20 is also accessible by vehicle dealer 4 which is associated with a make B (e.g. Mazda™) different from the make A (i.e. A≠B). In this embodiment, and referring to FIG. 4B, the system 10 is configured to receive the interest notices 24 (i.e. 1, 2, 3, and 4) indirectly from the interested vehicle dealers 1, 2, 3, and 4 via the Internet-based live data stream 22. In this embodiment, as seen in FIG. 4C, the system 10 is configured to forward the contact data 26 associated with the customer to privileged vehicle dealers associated with make A and associated with make B, for instance. It is understood that the system 10 can be configured to forward the contact data 26 to a first quantity of vehicle dealers associated with a make similar to the make associated with the vehicle make data and to forward the contact data to a second quantity of vehicle dealers associated with a make different from the make associated with the vehicle make data. In the example illustrated in FIGS. 4A-C, it is understood that the first quantity is three and the second quantity is one. Other suitable numeric values for the first and second quantities can be used, depending on the circumstances.

In another aspect, there are disclosed a system, a computer program product and a computer-implemented method for forwarding contact data associated with a potential customer. The system has a processor coupled with a computer-readable memory, and the computer-readable memory is configured for storing computer executable instructions that, when executed by the processor, perform the steps of a computer-implemented method. The computer program product can include the aforementioned computer-readable memory. The computer-implemented method includes the steps of receiving customer purchase data from the potential customer, the customer purchase data comprising the contact data and mortgage preference data; publishing a purchase interest notification on an Internet-based live data stream accessible by a plurality of lenders via Internet, the purchase interest notification including the mortgage preference data of the customer purchase data; receiving a plurality of interest notices associated with the purchase interest notification from interested ones of the plurality of lenders; and forwarding the contact data of the potential customer to at least one privileged lender based on said reception.

In some embodiments, the method can have steps of, after said receiving the plurality of interest notices, associating a time value to each one of the plurality of received interest notices; and determining at least one privileged lender amongst the interested lenders based on the time values of the received interest notices.

In some other embodiments, the mortgage preference data include loan data. For instance, the loan data can include an indication as to which of the following goal is pursued by the potential customer: i) renew or renegotiate the terms of the mortgage, ii) finance a new purchase (e.g., property), or iii) pre-approve a mortgage.

The mortgage preference data can include property data indicative of the type of property that is desired (e.g., house, condo, duplex, triplex, multiplex). The mortgage preference data can include the desired amount of the mortgage loan, the estimated value of the property, the cash down amount that is available, the name of the financial institution with which the potential customer dealt in her/his last mortgage loan, if applicable, and/or estimated purchase date data indicative of the purchase date of associated with the purchase.

In alternate embodiments, the customer purchase data further comprise geographical data associated with the potential customer. For instance, the customer purchase data can include a city, the zip code and/or the postal address associated with the property.

The contact data can include a name, a surname, a work phone number, a home phone number, a mobile phone number, a personal email address, a work email address, a birth year associated with the potential customer. The contact data can also include preferences as to how and when to reach the potential customer. For instance, by phone, by SMS or by email, and between 8:00 AM and 12:00 PM, between 12:00 PM and 1:30 PM, between 1:30 PM and 17:00 PM or between 5:00 PM and 9:00 PM.

The step of forwarding may be further based on the geographical data associated with the potential customer and on geographical position of the interested lenders. The step of forwarding may be based on the interest notices which are received first. The method may also have a step of forwarding the estimated purchase date data along with the contact data to the at least one privileged lender.

As can be understood, the examples described above and illustrated are intended to be exemplary only. For instance, the Internet-based live data stream can be an intranet-based live data stream that is used within different vehicle dealers associated with the same make. Further, in an embodiment, the vehicle dealers have to become member vehicle dealers by paying a membership fee in order to access the Internet-based live data stream. In another embodiment, the vehicle dealers pay an amount of money for each potential customer contacted. It is understood that the methods and systems can be used by vehicle dealers and also by one or more other service providers of the vehicle industry or other industries (e.g., financial service industry). For instance, the service providers can be vehicle insurers which desire to obtain data about the potential customer. In this embodiment, the data that is forwarded to privileged ones of the vehicle insurers can comprise date of birth data indicating the date of birth of the potential customer as well as estimated purchase date data indicating the date at which he/she estimates that the new vehicle will be bought. In another embodiment, the methods and systems described herein can be used by other service providers of the vehicle industry (e.g. satellite radio providers and the like). The scope is indicated by the appended claims.

What is claimed is:

1. A computer-implemented method of forwarding contact data associated with a customer, the method comprising the steps of:

receiving customer purchase data from the customer, the customer purchase data comprising the contact data and mortgage preference data, the mortgage preference data including a given lending entity selected by the customer at the time the customer purchase data were entered;

publishing a purchase interest notification on an Internet-based live data stream accessible by a plurality of lenders via Internet, the purchase interest notification including the mortgage preference data of the customer purchase data, the plurality of lenders including at least one privileged lender associated with a lending entity different from the given lending entity selected by the customer;

receiving a plurality of interest notices associated with the purchase interest notification from interested ones of the plurality of lenders, at least one of the plurality of interest notices received from the at least one privileged lender associated with a lending entity different from the given lending entity selected by the customer; and forwarding the contact data of the customer to at least one privileged lender based on said receiving, wherein the step of forwarding includes forwarding the contact data to the at least one privileged lender associated with a lending entity different from the given lending entity selected by the customer.

2. The computer-implemented method of claim 1, further comprising, after said receiving the plurality of interest notices, associating a time value with each one of the plurality of received interest notices; and determining the at least one privileged lender among the interested lenders based on the time values of the received interest notices.

3. The computer-implemented method of claim 1, wherein the mortgage preference data comprise loan data.

4. The computer-implemented method of claim 1, wherein the given lending entity selected by the customer is at least one of a customer-preferred mortgage advisor and a customer-preferred financial institution.

5. The computer-implemented method of claim 1, wherein the at least one privileged lender comprises more than one privileged lender, the more than one privileged lender comprising a first quantity of lenders associated with the given lending entity and a second quantity of lenders associated with a lending entity different from the given lending entity selected by the customer.

6. The computer-implemented method of claim 5, wherein the first quantity is limited to three.

7. The computer-implemented method of claim 1, wherein the customer purchase data further comprise geographical data associated with the customer.

8. The computer-implemented method of claim 7, wherein said forwarding is further based on the geographical data associated with the customer and on geographical position of the interested lenders.

9. The computer-implemented method of claim 1, wherein the mortgage preference data comprise property data.

10. The computer-implemented method of claim 1, wherein said forwarding is further based on the interest notices which are received first.

11. The computer-implemented method of claim 1, wherein said contact data comprise at least one of a telephone number and an email associated with the customer.

12. The computer-implemented method of claim 1, wherein the interest notices are received via the live data stream.

13. The computer-implemented method of claim 1, wherein the customer purchase data further comprise estimated purchase date data, wherein the computer-implemented method further comprises a step of forwarding the estimated purchase date data along with the contact data to the at least one privileged lender.

14. A system for forwarding contact data associated with a customer, the system comprising:

a processor coupled with a computer-readable memory, the computer-readable memory being configured for storing computer executable instructions that, when executed by the processor, perform the steps of:

receiving customer purchase data from the customer, the customer purchase data comprising the contact data and mortgage preference data, the mortgage preference data including a given lending entity selected by the customer at the time the customer purchase data were entered;

publishing a purchase interest notification on an Internet-based live data stream accessible by a plurality of lenders via Internet, the purchase interest notification including the mortgage preference data, the plurality of lenders including at least one privileged lender associated with a lending entity different from the given lending entity selected by the customer;

receiving a plurality of interest notices associated with the purchase interest notification from interested ones of the plurality of lenders, at least one of the plurality of interest notices received from the at least one privileged lender associated with a lending entity different from the giver lending entity selected by the customer; and forwarding the contact data of the customer to at least one privileged lender thereby allowing the at least one privileged lender to contact the customer in response to the customer purchase data, wherein the step of forwarding includes forwarding the contact data to at least one privileged lender associated with a lending entity different from the given lending entity selected by the customer.

15. The system of claim 14, wherein the computer executable instructions further comprise, after said receiving, associating a time value with each one of the plurality of received interest notices; and determining the at least one privileged lender among the interested lenders based on the time values of the received interest notices.

16. The system of claim 14, wherein the mortgage preference data comprise loan data.

17. The system of claim 14, wherein the given lending entity selected by the customer is at least one of a customer-preferred mortgage advisor and a customer-preferred financial institution.

18. The system of claim 14, wherein the at least one privileged lender comprises more than one privileged lender, the more than one privileged lender comprising a first quantity of lenders associated with the given lending entity selected by the customer and a second quantity of lenders associated with a lending entity different from the given lending entity selected by the customer.

* * * * *